Figure 1:
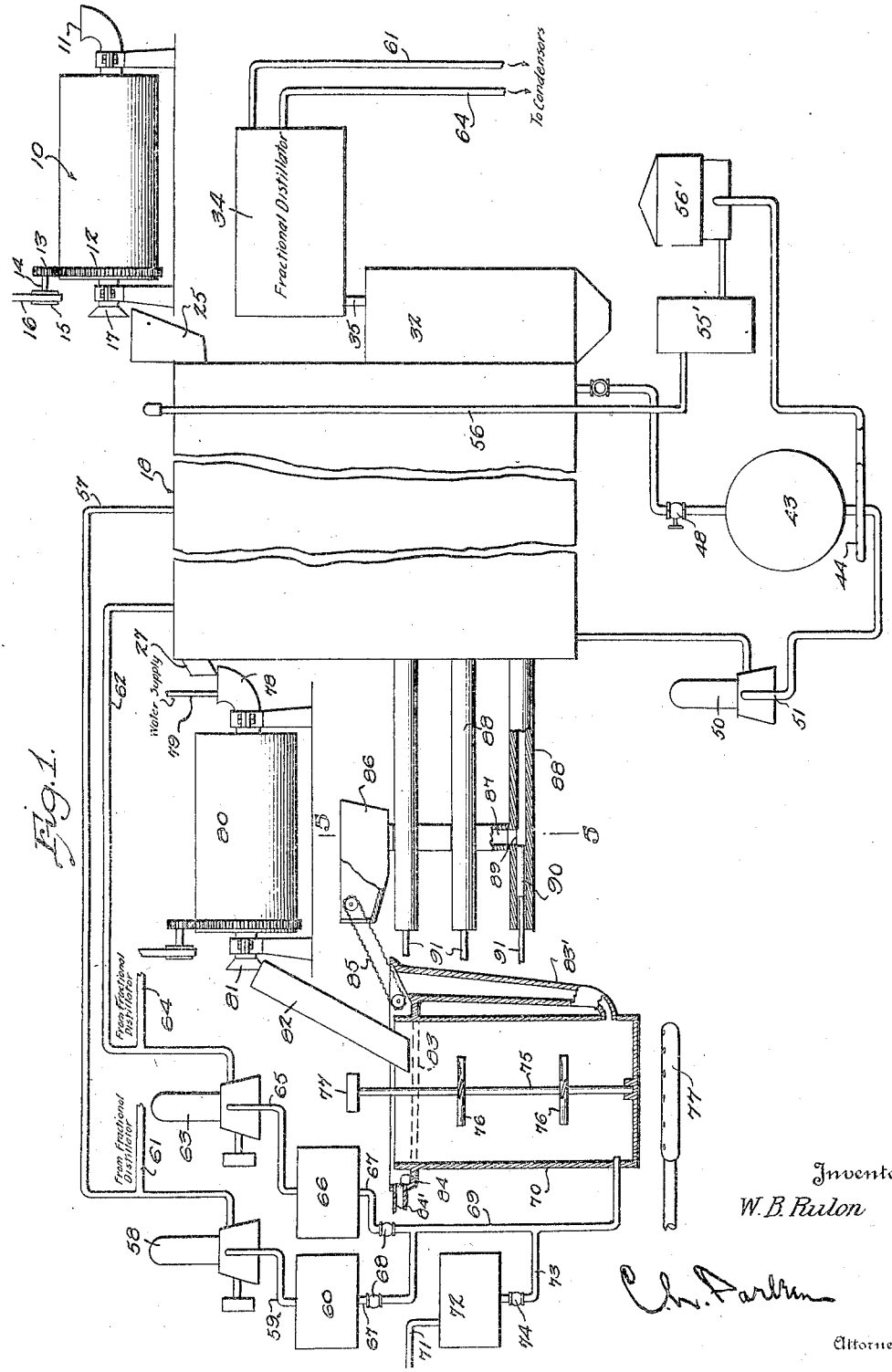

Jan. 17, 1928.

W. B. RULON 1,656,364

METHOD FOR FORMING RECONSTRUCTED CARBONACEOUS FUEL

Filed July 28, 1925 5 Sheets-Sheet 1

Inventor
W. B. Rulon
Attorney

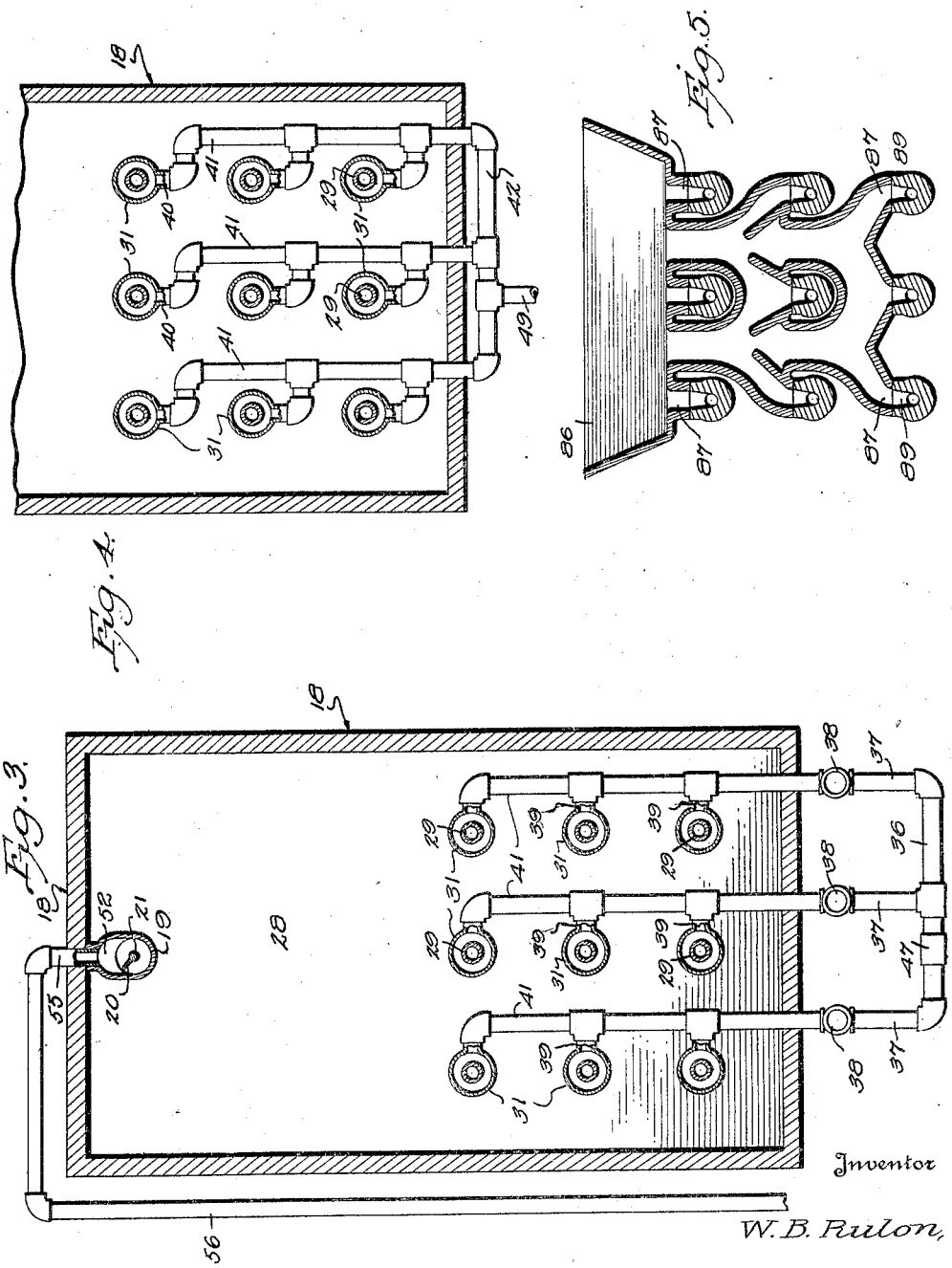

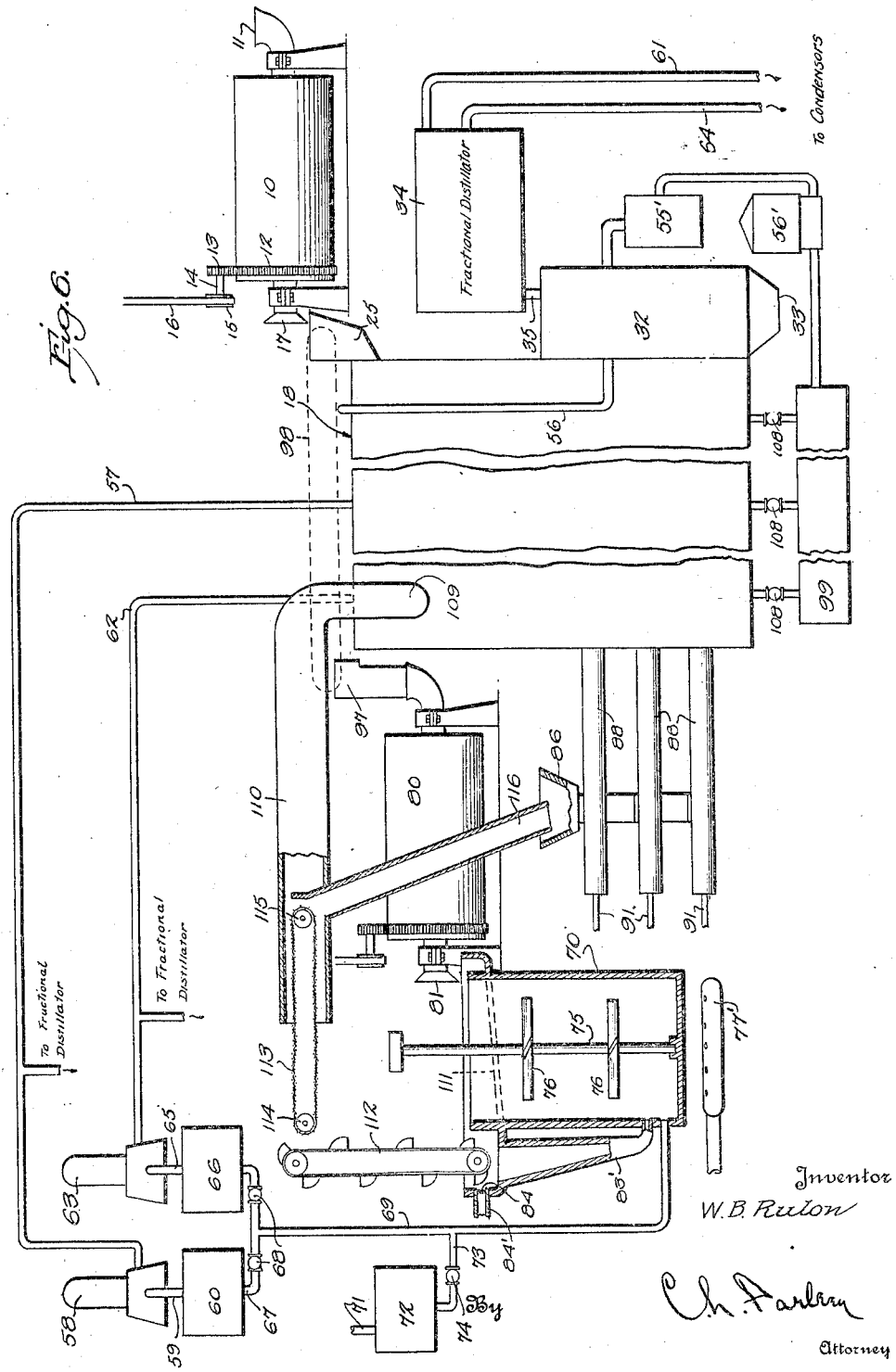

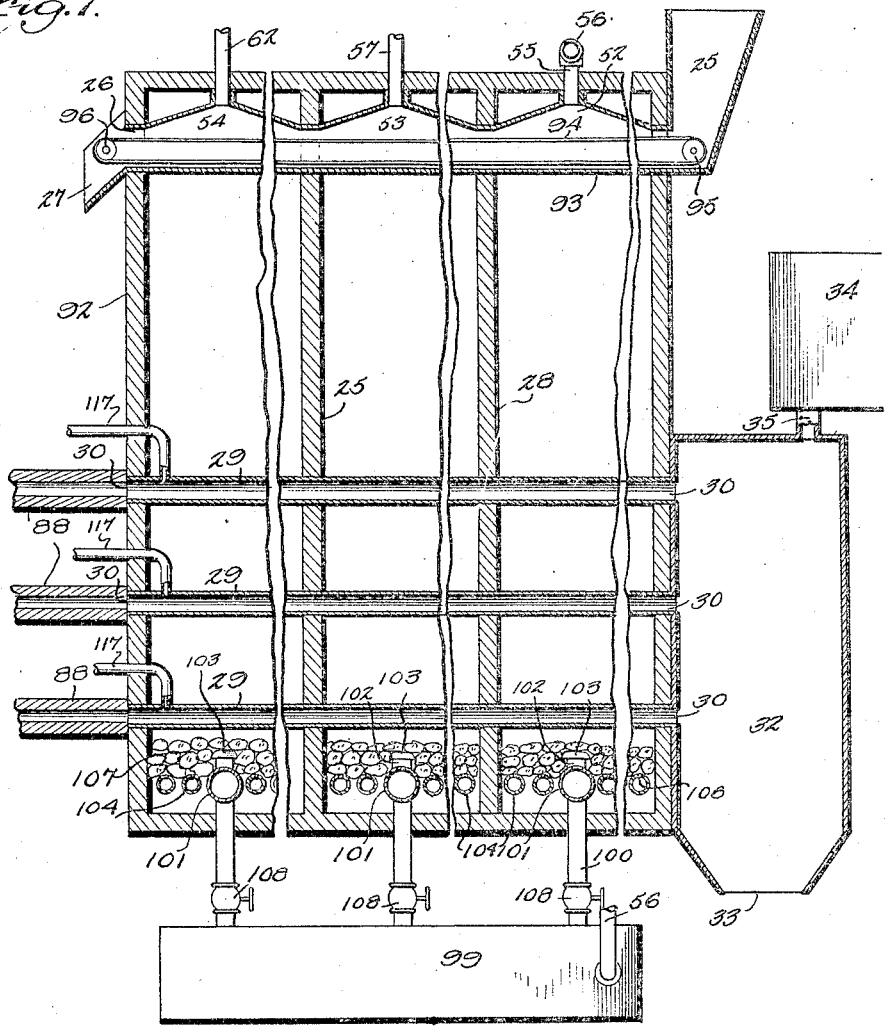
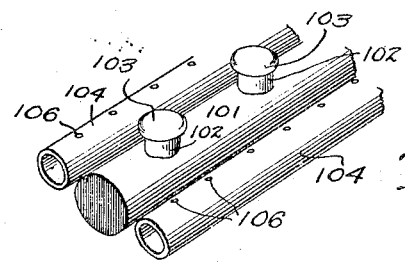

Patented Jan. 17, 1928.

1,656,364

UNITED STATES PATENT OFFICE.

WATSON B. RULON, OF PHILADELPHIA, PENNSYLVANIA.

METHOD FOR FORMING RECONSTRUCTED CARBONACEOUS FUEL.

Application filed July 28, 1925. Serial No. 46,676.

This invention relates to the purification of carbonaceous materials containing varying amounts of volatiles, to remove foreign matter therefrom to produce a resultant reconstructed fuel which is substantially free from foreign non-combustible material.

It has heretofore been proposed to crush the crude material to be treated to reduce it substantially to a fine powder whereupon it is conveyed to what is known as an amalgamator where it is agitated in the presence of water, and volatiles from an extraneous source are introduced into the amalgamator where they are taken up by the carbonaceous material. The action of the amalgamator separates foreign matter such as slate, ash, etc., from the carbon so that the volatiles introduced to the amalgamator combine only with the substantially pure carbon. From the amalgamator the material is heated to drive off a portion of the moisture taken up in the amalgamator and also to drive off a portion of the volatiles then contained in the carbonaceous material. The resultant material formed has been found to consist of substantially pure carbon together with volatiles which forms an excellent fuel which burns substantially without residue, such as ash and the like. Considerable trouble has been experienced in providing heating means for driving off moisture and some of the volatiles in forming the resultant fuel. In the methods heretofore employed, the heating step has been carried out while the material is in a more or less divided condition in the form of globules and the heating has been done in the presence of the products of combustion from the heating means employed. I have found that the material previous to passing to the heating means may be formed in relatively large pieces, such as bars of varying lengths, and the heating action may be carried out to drive off moisture and volatiles without breaking the material, thus providing a resultant reconstructed fuel which may be delivered in sizes corresponding to the sizes of domestic fuels for more ready combustion instead of the globular form as previously has been done. It also has been found that the heating action may be more advantageously carried out in a continuous tube which is slightly larger than the diameter of the pieces or bars of the semi-finished fuel, the tubes preventing the products of combustion from contacting with the material while the slightly larger diameter of the heating tubes permits the volatiles driven off to be collected and condensed for further use.

It is an important object of the invention to gather the material formed by successive initial steps in the processes now known whereby a relatively pure carbonaceous material is amalgamated with a suitable percentage of volatiles, and form this material into pieces or bars of material size while in a substantially semi-plastic condition, and then driving off a portion of the moisture and a portion of volatiles to provide a finished resultant reconstructed fuel.

A further object is to carry out the final heating step of the method outlined above in successive steps of increasing heat intensity for driving off moisture and a relative percentage of the volatiles contained in the semi-finished fuel whereby the latter will retain its form and harden without breaking.

A further object is to perform the final heating action while the semi-finished fuel passes through an atmosphere of air whereby the fuel is more rapidly hardened to assume its finished form.

A still further object is to utilize the waste or excess heat from the heating step for initially heating the crude material to drive off the relative lighter and heavier volatiles from the raw carbonaceous material.

I also provide an apparatus suitable for carrying out the method above outlined. In the provision of the apparatus, it is an important object to provide a unitary heating means adapted to perform both the heating actions referred to, thus materially simplifying the apparatus employed and effecting a material saving in fuel consumption incident to the heating operations, the heating apparatus employing as its fuel the lighter volatile constituents initially driven off the crude material employed.

A further object is to provide novel means for a final heating action wherein the amalgamated carbons and volatiles are extruded into a completely closed tube which is externally heated whereby the products of combustion from the heating means are prevented from coming in contact with the material being treated.

A still further object is to provide a novel form of heating apparatus wherein heating zones of increasing intensity are provided for progressively driving off the lighter to the heavier volatile constituents.

A still further object is to provide means for extruding semi-plastic material from the amalgamator in the form of a rod or bar and to introduce the rods or bars thus formed into a heating tube of greater diameter than the bars, the bars passing substantially continuously through the tubes to be heated therein.

Other objects and advantages of the invention will become apparent during the course of the following description.

In the drawings I have have shown several forms of apparatus adapted for forming the resultant fuel. In this showing, Figure 1 is a diagrammatic view of the apparatus, Figure 2 is a vertical longitudinal sectional view through the heating apparatus, Figure 3 is a section on line 3—3 of Figure 2, Figure 4 is a similar view on line 4—4 of Figure 2, Figure 5 is a section on line 5—5 of Figure 1, Figure 6 is a diagrammatic view showing a modified form of apparatus, Figure 7 is a view similar to Figure 2 showing a modified form of heating apparatus, and, Figure 8 is a fragmentary perspective view of the heating means employed in connection with the form of the heating apparatus shown in Figure 7.

Referring to Figure 1, the numeral 10 designates a crusher of any suitable kind adapted to be supplied with crude material through an end hopper 11. The crusher is provided with a ring gear 12 adapted to be rotated by a pinion 13 mounted on a shaft 14. A pulley 15 is secured to the shaft 14 and is adapted to be driven by a belt 16 from any suitable source of power. The crusher is adapted to discharge material therefrom to an outlet spout 17. The crusher 10 preferably reduces the material to such a degree of fineness that it will pass through from a 10 to 20-mesh screen.

Figure 2:
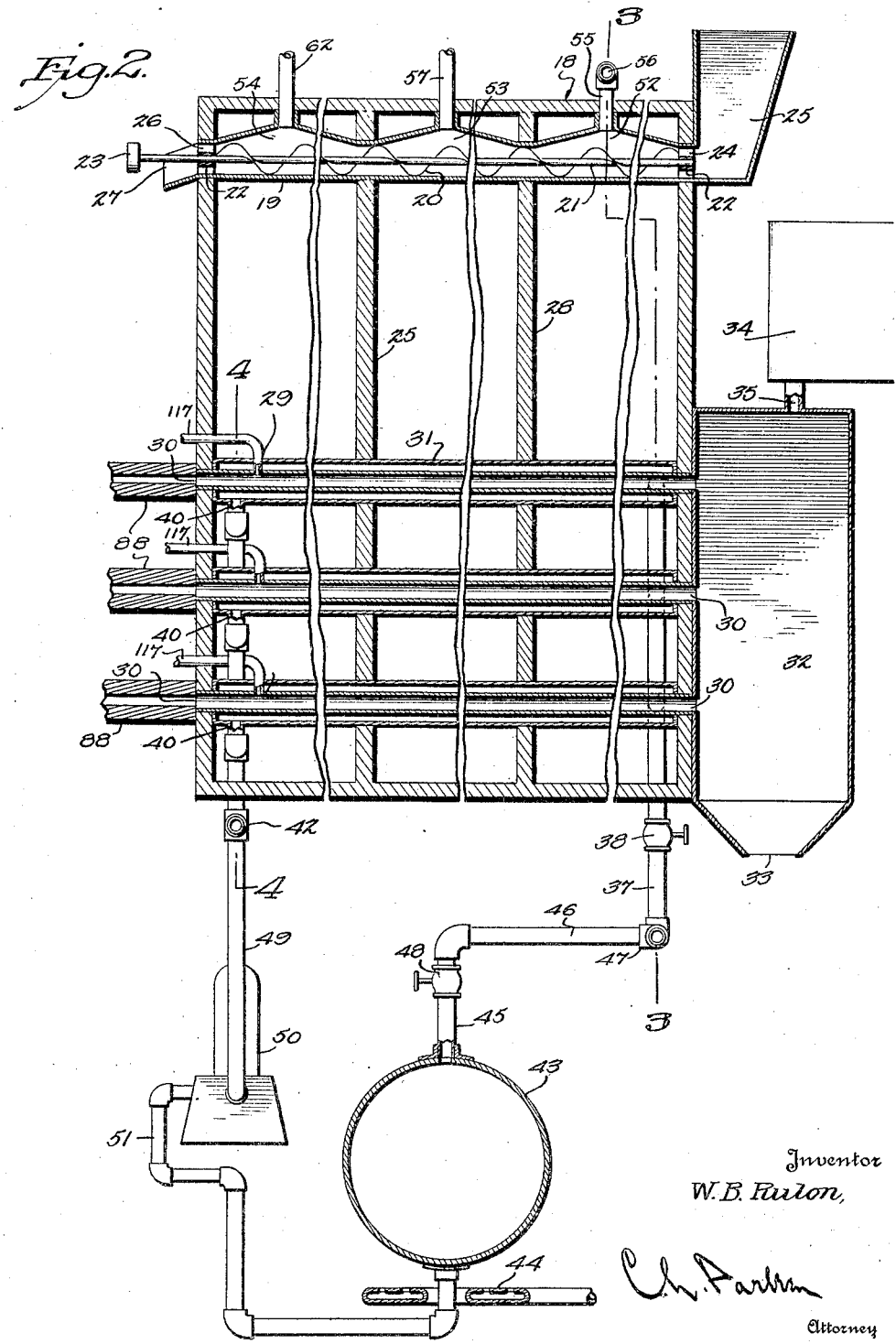

Referring to Figures 1 and 2, the numeral 18 designates as a whole a heating apparatus preferably formed of fire brick and substantially enclosed. The heating apparatus is provided near its upper end with a longitudinally extending conveyor 19 having a screw 20 therein secured to a shaft 21 to be rotated thereby. The shaft is mounted in bearings 22 and is adapted to be rotated by a suitable pulley 23 shown in Figure 2. At its inlet end, the conveyor is open as at 24 for communication with an inlet hopper 25 which is adapted to receive material from the outlet end of the crusher 10. The opposite end of the conveyor is open as at 26 to discharge material upon a spout 27. The heating apparatus 18 is divided transversely by preferably equidistantly spaced walls 28 as shown in Figure 2. A plurality of tubes 29 extend through the lower portion of the heating apparatus and are open at their ends as shown at 30. The tubes are surrounded between the end walls of the heating apparatus by jackets or chambers 31 which extend through the walls 28 as shown. The outlet ends of the pipes 29 communicate with a discharge chamber 32 having an open lower end 33. The upper end of the discharge chamber communicates with a fractional distillator 34 through a suitable pipe 35 for a purpose to be described.

Means are provided for effectively heating the tubes 29. As shown in Figures 2 and 3, I provide a pipe 36 which communicates with vertically extending manifold pipes 37 adapted to be controlled by valves 38. The upper portions of the pipes 37 are provided with branch pipes 39 which communicate with the heating jackets 31 near the outlet ends of the pipes 37. The opposite ends of the jackets 31 are provided with branch pipes 40 each of which communicates with an outlet manifold 41 and the lower ends of the manifolds are connected by a cross pipe 42 below the heating apparatus.

The chambers 31 may be heated by any suitable form of vapor circulating therethrough and in the drawings I have shown an apparatus for employing mercury vapor as the heating means. As shown, I provide a boiler 43 adapted to contain the mercury vapor to be heated by a gas burner 44 arranged therebelow. An outlet pipe 45 communicates with the upper portion of the boiler and is connected to a pipe section 46 which in turn is connected through a T 47 to the pipe 36 as shown in Figures 2 and 3. The valve 48 is adapted to control passage of the vapors through the pipe 45. The cross pipe 42 is connected with a return pipe 49 shown in Figures 2 and 4, and this pipe connects to the inlet end of a condenser 50 which has an outlet pipe 51 communicating with the lower portion of the boiler.

As shown in Figure 2, the conveyor 19 is provided with domes 52, 53 and 54. The dome 52 communicates with an outlet pipe 55 extending through the upper wall of the heating apparatus and this pipe is provided with a depending portion 56, shown in Figure 1, connected to a scrubber 55' and a gasometer 56' to condition the fuel, and from the gasometer the fuel passes to the burner 44 to supply fuel thereto. The dome 53 is provided with an outlet pipe 57 the opposite end of which is connected to a condenser 58, as shown in Figure 1 and this condenser is provided with an outlet pipe 59 which leads to a storage tank 60. Volatiles driven off the conveyor through the pipe 57 are adapted to be condensed by the condenser 58 and the supply of volatiles to the condenser may be augmented through a pipe 61 having its opposite end connected to the fractional distillator 34 as shown. A pipe 62 communicates with the dome 54 to receive volatiles therefrom and this pipe is connected to a condenser 63 and the supply of volatiles to this condenser also may be augmented through a pipe 64 having its opposite end also connected to the fractional distillator as shown in Figure 1. The condenser 63 is provided with an outlet pipe 65 through which condensed volatiles are supplied to a storage tank 66. Outlet pipes 67 communicate with the tanks 60 and 66 and passage of material through these pipes is adapted to be controlled by valves 68. The pipes 67, beyond the valve 68, are both connected to a common outlet pipe 69, the lower end of which communicates with an amalgamator 70 near the lower end thereof. Additional volatiles may be supplied to the amalgamator if desired, through a pipe 71 communicating with a supply tank 72. A pipe 73 connects the tank 72 to the pipe 69 and passage of the material through the pipe 73 is adapted to be controlled by a valve 74.

Any suitable form of amalgamator may be employed. In the present instance, I have shown the amalgamator as being substantially cylindrical and provided centrally thereof with an agitator shaft 75 having angular agitator blades 76 secured thereto and adapted to force the material in the amalgamator upwardly. The shaft may be driven by a suitable pulley 77. A burner 77' may be arranged below the amalgamator whereby the material in the latter may be maintained constantly at any desired temperature.

The outlet spout 27 of the conveyor is adapted to discharge material into a hopper 78 and water may be supplied to the hopper through a pipe 79. The hopper 78 is adapted to feed material into a crusher 80 adapted to be driven in the same manner as the crusher 10 previously described. It has been found that the crushing action more efficiently may be carried out in the presence of water and it is desirable to supply water to the crusher through the pipe 79. It is desired that the crusher 80 effect a reduction of the material passing therethrough to a relatively great degree of fineness to effect a mechanical breaking of the carbon and foreign materials contained in the material being treated. Accordingly, I prefer to reduce the material in the crusher 80 to a degree of fineness whereby it will pass through a screen of approximately 200 mesh. The crusher 80 is provided with an outlet spout 81 which discharges material into a chute 82 from whence it passes downwardly to the amalgamator 70, as will be obvious.

The amalgamator is provided with a surrounding trough 83, the upper edge of which may be arranged slightly above the upper edge of the amalgamator cylinder proper. A return conduit 83' is connected between the trough and the lower portion of the amalgamator to permit circulation of the water oil, amalgam and pulverized coal as the blades 76 move the material in the amalgamator upwardly. One wall of the trough may be provided with an opening covered by a screen 84 through which water and foreign material such as ash, etc., may flow, to be carried off through a pipe 84' to a suitable launder. The amalgamated material overflowing into the trough 83 will be picked up by a conveyor 85 which is preferably formed of woven fabric such as screen wire to permit water to drain from the material. From the conveyor 85 the material will be deposited in a hopper 86 shown in detail in Figure 5 of the drawings.

The hopper 86 is provided with a plurality of discharge openings 87 corresponding in arrangement to a plurality of extruding tubes 88. The extruding tubes in turn correspond in arrangement with the pipes 29 and each is provided with an inlet opening 89 through which material flows from the hopper. In Figure 1 I have diagrammatically shown a means which may be provided for extruding the material from the hopper into the pipes 29. A piston 90 may be employed to reciprocate in each of the tubes 88 and each piston is connected to a rod 91 which may be driven by any suitable source of power to reciprocate the piston.

The internal diameter of the extruding tubes 88 is somewhat smaller than the internal diameter of the heating tubes 29 as shown in Figure 2, and it will be obvious that the rods or bars extruded from the tubes 88 will rest upon the lower portions of the tubes 29 providing a space nearly surrounding the extruded bars for a purpose to be described.

In Figures 6 and 7 of the drawings, I have shown a somewhat modified form of apparatus. In the modified form the general assembly of elements is substantially the same as in the form previously described. In the modified form of the apparatus I employ a heating chamber 92 which is generally similar to the form previously described except that there is employed a different form of conveying means for the initial heating and a different heating apparatus for heating the chamber 92. As shown, I provide a conveyor 93 having take-off domes for the volatiles similar to those described in connection with the form of the invention already described. The conveyor 93 is provided with a conveying belt 94 therein and this belt passes about pulleys or rollers 95 and 96 at opposite ends. The conveyor belt is adapted to discharge material into a hopper 97 which delivers the material to the crusher 80 previously described. The hopper 97 may extend upwardly as shown and may be supplied with material directly from the crusher 10 by a conveyor 98 shown in dotted lines in Figure 6. The conveyor 98 preferably is employed when the method and apparatus is being used in connection with crude material having a low volatile content while more highly volatile materials are preferably passed through the conveyors to be heated.

The heating apparatus 92 is also provided with a pipe 56 to supply the fuel for the heating operation. Instead of heating mercury vapor or the like externally of the heating apparatus and supplying the vapor to heating jackets as previously described, the gases through the pipe 56 in the modified form of apparatus are adapted to be burned directly within the heating chamber 92. As shown, the lower end of the pipe 56 in the modified form of apparatus supplies the gas to a manifold 99 from whence it is distributed through pipes 100 to transverse burner pipes 101 arranged within the lower portion of the heating chamber as clearly shown in Figure 7. These pipes 101 extend transversely of the heating apparatus and are provided at spaced intervals with upstanding burner tubes 102 covered by caps 103. Air for supporting combustion of the gas is supplied through pipes 104 having open ends 105 arranged externally of the heating chamber and the air pipes 104 are provided with rows of openings 106 through which the air passes. The air pipes are arranged in horizontal alinement with the pipes 101 and both sets of pipes are adapted to act as a grate, to support a bed of refractory aggregates 107. The heat generated by the gas from the burner tubes 102 is adapted to raise the temperature of the aggregates 107 to a point of incandescence. In the modified form of apparatus, it will be noted that the tubes 29 will be acted on directly by the heat generated in the refractory aggregates and of course are not surrounded by heating tubes as in the case of the apparatus previously described.

Control valves 108 are arranged in the pipes 100 so that the combustion of fuel from the individual burner pipes may be controlled to set up heat zones of different intensities between the division walls 28.

As shown in Figure 6, a flue 109 is connected to the heating chamber 92 to carry off the products of combustion formed in the gas burners. The flue 109 is provided with a horizontally extending enlarged portion 110 for a purpose to be described.

In the form of the invention illustrated in Figure 6 I provide an amalgamator 70 as previously described having an outlet trough 111 into which material is delivered. A lifting conveyor 112 is adapted to convey the material upwardly to a horizontal endless screen 113 which passes about rollers 114 and 115. The conveyor 113 is preferably in the form of a wire screen to permit the water in the material to be drained downwardly into the amalgamator. One end of the conveyor 113 is arranged within the horizontal portion 110 of the flue to be slightly heated thereby to drive off some of the moisture. A chute 116 is adapted to convey material from the screen 113 to the hopper 86 previously described.

It has been found that the semi-finished fuel will harden more readily in an atmosphere of air than in the presence of the volatiles driven off from material in the tubes 29. Accordingly pipes 117 are provided which communicate with the interior of the pipes 29 to supply air thereto.

The operation of the apparatus is as follows:

The crude material is fed to the crusher 10 if the material is sufficiently coarse to require crushing. It will be obvious that any carbonaceous material may be employed such as for instance, the low volatile anthracite coals and high volatile bituminous coals, etc. This material may be raw coals or may be obtained from screenings, mine wastes or any other solid carbonaceous matter. After being reduced substantially to a degree of fineness whereby it will pass through a screen of approximately 10 to 20 mesh, the material will be fed into the hopper 25 if the material employed contains a relatively high percentage of volatiles. From the hopper 25, the material will be conveyed by the screw 20 through the conveyor 19, as will be apparent. The material fed into the hopper is, of course, at an ordinary temperature and will become heated within the conveyor. Since the material fed into the hopper is at an ordinary temperature, it will be apparent that it will be gradually heated as it is conveyed by the screw. The initial heating of the crude material will drive off some of the lighter volatile constituents such as benzol and the like, and this volatile material in the form of gas will pass downwardly through the pipe 56 to provide fuel for the burner 44. As the material in the conveyor becomes heated to a higher temperature, a second heat zone will be reached in the central portion of the heating chamber and some of the heavier volatiles, such as pitch, will be drawn off together with a small amount of benzol which previously has not been completely volatilized and it is probable that some smoke also will be given off. As the material passes through the conveyor its temperature will be raised until it reaches the third stage as illustrated wherein the heavier volatiles will pass upwardly through the pipe 62. While I have illustrated the heating of the raw material as taking place in three stages, it will be apparent that any number of stages may be employed whereby the material will be raised in temperature to drive off the lighter and heavier volatile constituents.

From the conveyor previously mentioned, the material will be discharged into the hopper 78 of the second crushing mill 80 and the material will be of substantially the same granular form as when introduced into the heating chamber. In the mill 80 the material is crushed to a relatively fine powder such as would pass through a screen of substantially 200 mesh and it will be discharged from the mill through the chute 82 into the amalgamator 70. As previously stated, water is supplied to the mill 80 through the pipe 79 and flows with the ground material into the amalgamator. The granular material is agitated in the amalgamator by the arms 76 carried by the shaft 75, as will be obvious. As previously stated, the heavier volatiles driven off in the heating apparatus will pass upwardly from the domes 53 and 54 into the pipes 57 and 62 respectively. Volatiles from the pipe 57 will be carried to the condenser 58 from whence the volatile material in the form of liquid will be supplied to the storage tank 60. Similarly, the heavier constituents from the pipe 62 will be condensed by the condenser 63 and will be supplied to the storage tank 66. Flow of the condensed volatiles from the tanks 60 and 66 to the amalgamator may be controlled by the valve 68 as will be obvious. If it is found necessary or desirable to supply volatiles from an extraneous source, this additional supply may be obtained from the storage tank 72. Thus it will be seen that the volatiles in desired quantities are supplied to the amalgamator through the pipe 69 while the agitation of the semi-finished fuel and water is being carried on. The volatiles flowing into the amalgamator will combine somewhat as an amalgam with the pure carbon in the amalgamator, and the action of the agitating propellers will cause the amalgam to rise. The volatiles have been found to have a very high affinity for the carbon in the amalgamator but have no affinity whatever for the foreign substances such as slate, ash, etc., after they have become wet. The amalgamation of the carbon and volatiles will form small globules of a semi-plastic material and these globules will increase in size as agitation is continued and additional solid material and volatiles are fed into the conveyor. In this connection it is pointed out that the product which it is desired to obtain from the amalgamator preferably should be in a semi-plastic condition in order that a number of the globules may be compressed to form solid relatively large pieces and accordingly it may be desired to supply to the amalgamator a quantity of volatiles in excess of that required to properly amalgamate with the carbon. It will be obvious that the provision of means for supplying the volatiles from an extraneous source permits this excess to be maintained when found desirable. As stated, the amalgam will overflow into the trough 83 from whence it will be carried by the screen 85 to the hopper 86. I prefer to employ a mesh screen as the conveyor 85 so that excess water may drain from the material before it is fed into the hopper. Water and some foreign material also will overflow into the trough and some of it will return to the amalgamator through conduit 83'. Excess water will be supplied to the amalgamator from the mill 80, and this excess, together with some of the powdered foreign material, will be disposed of through the pipe 84'.

The material in the hopper will be fed downwardly to be distributed to the various extruding tubes 88, flowing thereinto through the openings 87 and 89. The plungers 90 will be reciprocated to force the material forwardly in the extruding tubes and each inward movement of each plunger will tend to cause a binding action between the globules of the semi-finished fuel, the binding action being possible due to the semi-plastic condition of the material. As each plunger is moved rearwardly, an additional supply of the globules will be supplied to each of the tubes and the next inward movement of each plunger will again unite the globules into a relatively solid mass which will not adhere tightly to the mass formed by the previous inward movement of the plunger. Thus it will be seen that each of the plungers forms a bar of the semi-plastic material and as these bars are forced inwardly they will pass into the tubes 29 and will travel entirely thereacross as additional material is forced from the extruding tubes. As the bars of material formed in the extruding tubes pass through the tube 29 they will be progressively heated as will be understood. As previously stated, the tubes 29 are slightly greater in diameter internally than the extruding tubes and it will be apparent that a small space will be provided almost entirely around the bars of material passing through the tubes 29. The semi-plastic material entering the tubes 29 contains approximately 35 per cent volatile material and at the point of discharge from the tubes 29 the percentage of volatiles is reduced to approximately 15 per cent. or less at which point the material assumes a state of hardness approaching that of ordinary anthracite coal. As stated, the hardening of the semi-finished fuel may be carried out more advantageously in an atmosphere of air than in the presence of the volatiles being driven off from the fuel. Accordingly, air may be continuously introduced into the pipes 29 through the air pipes 117. The divisions defined by individual reciprocations of the plungers 90 will define the lengths of the pieces of fuel discharged from the openings 30, as will be obvious. The material will be discharged from the lower end of the chamber 32 and the volatiles driven off from the material in the tubes 29 will collect in the chamber 32 and will flow upwardly therein. From the upper end of the chamber the volatiles will flow through the pipe 35 into the fractional distillator wherein the volatiles of different specific gravities will be separated and discharged through pipes 61 and 64 to the condensers 58 and 63 as will be apparent. If desired a blower may be employed for drawing the volatiles from the chamber 32 to the fractional distillator.

In the form of the apparatus illustrated in Figures 1 to 4 inclusive, I have shown means for heating the chamber 18 by mercury vapor. Gas will be supplied to the burner 44 from the dome 52 and it will be apparent that the burner will heat the boiler 43 to vaporize the mercury. The mercury vapor will flow upwardly through pipes 45 and 46 from whence they will be distributed to the vertical manifolds 37. Flow of the mercury vapor will be controlled by valves 38 to determine the temperature adjacent the discharge ends of the tubes 29. From the upper ends of the pipes 37, the mercury vapor will pass into the jackets 31 through pipes 39. It will be apparent that the temperature of the vapor will decrease as it flows toward the inlet ends of the tubes 29 due to the natural radiation of heat and will be discharged from the jackets 31 through pipes 40, as shown in Figures 2 and 4. From the pipes 40, the vapor will flow to the outlet manifolds 41 from whence it will be collected in the pipe 49 and conveyed to the condenser 50. From the condenser the mercury will be returned as liquid to the boiler 43 through the pipe 51 whereupon it will be reheated to continue its circulation.

The operation of the apparatus shown in Figures 6 and 7 is substantially the same as in the form previously described. In the modified form there is shown a belt conveyor 94 for conveying the material through the upper end of the heating chamber. The use of a belt conveyor has been found desirable when the apparatus is used in connection with materials having an unusually high volatile content. When the materials having a low volatile content are employed, the materials may be conducted directly from the mill 10 to the hopper 97 by the conveyor 98.

As previously stated, heating of the chamber 92 is accomplished directly by gas burners arranged in the chamber instead of by externally heated mercury vapors. Gas from the first dome 52 will be supplied through pipe 56 to the scrubber and gasometer from whence it passes to the manifold 99 to be distributed through the pipes 100 to the burner pipes 101, the flow of gas in each pipe 100 being controlled by its valve 108 whereby zones of different heat intensity may be created. The gas will burn as it passes from the burner tubes 102 and air for combustion will be supplied through pipes 104 and openings 106. Thus it will be obvious that the refractory aggregates 107 will be heated to incandescence to supply proper heat to the chamber 92. The cap 103 arranged on each burner tube is adapted to prevent particles of the refractories from falling into the burner pipes. Products of combustion from the chamber 92 will flow through the flue 109 to the enlarged portion 110 and the heat in the flue may be utilized for partially drying the material in the conveyor 113. The conveyor projects a material distance beyond the end of the enlarged portion of the flue to permit water to drain through the screen forming the conveyor, to the amalgamator 70. Material from the screen 113 will be fed to the hopper 86 through the chute 116, and from the hopper 86 it will be distributed to the various extruding tubes as previously described.

It will be apparent that the material in the tubes 29 will be protected from external influences, such as products of combustion, due to the fact that the materials are entirely enclosed within the tubes 29. It also will be apparent that the space provided around the bars of extruded material will permit the volatiles to flow freely from the tubes 29. It has been found that the final heating action may be carried out, particularly when done in stages of progressively increasing heat intensity without forming gas pockets within the bars of fuel, thus preventing breakage of the bars. Thus solid relatively large pieces of fuel are obtained from the apparatus and this fuel is highly suitable for domestic or other use and is subject to almost perfect combustion whereby practically no residue is left.

From the foregoing it will be apparent that the method adapted to be carried out by the apparatus previously described comprises generally in crushing the material to be treated, driving a portion of the volatile constituents therefrom and then the further crushing of the material to a considerable degree of fineness and agitating it in the presence of water or similar liquid while supplying condensed volatiles thereto to form an amalgam. After the formation of amalgam the process consists in forming the more or less plastic amalgam into relatively large pieces or bars of reconstructed fuel and heating them in a substantially closed chamber to dry the bars or pieces and reduce the volatile constituent thereof.

It is to be understood that the forms of the invention herewith shown and described are to be taken as preferred examples of the same and that various changes in the shape, size and arrangement of parts may be resorted to without departing from the spirit of the invention or the scope of the subjoined claims.

I claim:

1. The method of forming reconstructed fuel which consists in agitating a finely divided solid carbonaceous material in a liquid medium having no affinity therefor, introducing a volatile liquid having an affinity for said carbonaceous material into said liquid during agitation thereof to form a somewhat plastic amalgam in the form of small pieces, compressing a number of such pieces to form a single relatively large lump, and heating said lump to reduce the percentage of volatile liquid therein to the point where said lump becomes solid, the initial heat to which said lump is subjected being relatively low.

2. The method of forming reconstructed fuel which consists in agitating a finely divided solid carbonaceous material in a liquid medium having no affinity therefor, introducing a volatile liquid having an affinity for said carbonaceous material into said liquid during agitation thereof to form a somewhat plastic amalgam in the form of small pieces, compressing a number of such pieces to form a single relatively large lump, and passing the lump thus formed through heat zones of progressively increasing temperatures to reduce the percentage of volatiles therein to the point where the lamp becomes solid.

3. The method of forming reconstructed fuel which consists in agitating a finely divided solid carbonaceous material in a liquid medium having no affinity therefor, introducing a volatile liquid having an affinity for said carbonaceous material into said liquid medium during agitation thereof to form a somewhat plastic amalgam in the form of small pieces, draining the greater portion of the liquid medium from the pieces thus formed, extruding quantities of said pieces to form bars, and heating said bars to vaporize moisture therefrom and to reduce the percentage of volatiles in said amalgam to the point where the bars become solid.

4. The method of forming reconstructed fuel which consists in agitating a finely divided solid carbonaceous material in a liquid medium having no affinity therefor, introducing a volatile liquid having an affinity for said carbonaceous material into said liquid during agitation thereof to form a somewhat plastic amalgam, removing the amalgam from the liquid medium, and heating the amalgam in the presence of air to vaporize moisture from the amalgam and reduce the percentage of volatiles therein, and to harden the resultant product.

5. The method of forming reconstructed fuel which consists in agitating a finely divided solid carbonaceous material in a liquid medium having no affinity therefor, introducing a volatile liquid having an affinity for said carbonaceous material into said liquid during agitation thereof to form a somewhat plastic amalgam in the form of small pieces, compressing a number of such pieces to form a single relatively large lump, and heating said lump to progressively increase temperatures in the presence of air to reduce the percentage of volatile liquid therein to the point where said lump becomes solid.

6. The method of forming reconstructed fuel which consists in agitating a finely divided solid carbonaceous material in a liquid medium having no affinity therefor, introducing a volatile liquid having an affinity for said carbonaceous material into said liquid medium during agitation thereof to form a somewhat plastic amalgam in the form of small pieces, draining the greater portion of the liquid medium from the pieces thus formed, continuously extruding quantities of said pieces to form bars, and passing said bars in the presence of air through heat zones of progressively increasing temperatures to vaporize moisture therefrom and to reduce the percentage of volatiles in said amalgam to the point where the bars become solid.

In testimony whereof, I affix my signature.

WATSON B. RULON.

DISCLAIMER 1,656,364.—*Watson B. Rulon*, Philadelphia, Pa. METHOD FOR FORMING RECONSTRUCTED CARBONACEOUS FUEL. Patent dated January 17, 1928. Disclaimer filed August 29, 1931, by the patentee.

Hereby enters this disclaimer, to wit:

(1) To the method of claim 3, except where the heating of the bars takes place by passing said bars through heat zones of progressively increasing temperatures;

(2) To the method of claim 4, except where the heating of the amalgam takes place by passing it through heat zones of progressively increasing temperatures.

[*Official Gazette September 22, 1931.*]